United States Patent [19]

Sipek et al.

[11] 3,966,504
[45] June 29, 1976

[54] METHOD AND APPARATUS FOR THERMOCHEMICAL GAS SCARFING

[75] Inventors: Ladislav Sipek, Taby; Erik Smars, Rimbo, both of Sweden

[73] Assignee: Centro-Maskin i Goteborg AB, Goteborg, Sweden

[22] Filed: May 16, 1974

[21] Appl. No.: 470,445

[30] Foreign Application Priority Data
May 21, 1973 Sweden .............................. 7307144

[52] U.S. Cl. .................................. 148/9.5; 266/51
[51] Int. Cl.² ........................ B23K 7/06; B23K 7/08
[58] Field of Search ................. 148/9.6, 9.5, 9; 266/23 H, 23 S

[56] References Cited
UNITED STATES PATENTS

| | | | |
|---|---|---|---|
| 3,230,116 | 1/1966 | Wandelt | 148/9.5 |
| 3,322,578 | 5/1967 | Thompson | 148/9.5 |
| 3,415,693 | 12/1968 | Gollwitz | 148/9 |
| 3,647,570 | 3/1972 | Lytle | 148/9.5 |
| 3,752,460 | 8/1973 | Lytle | 148/9.5 |

*Primary Examiner*—W. Stallard
*Attorney, Agent, or Firm*—Lerner, David, Littenberg & Samuel

[57] ABSTRACT

The present invention relates to a method and an apparatus for initiating and maintaining a thermochemical process of scarfing the surface of a workpiece to remove surface defects like, e.g., cracks, in which there is used a unit of torches, continuously moving in relation to the workpiece, in which a spot or zone in the surface is burnt in oxygen or in other reacting medium.

15 Claims, 4 Drawing Figures

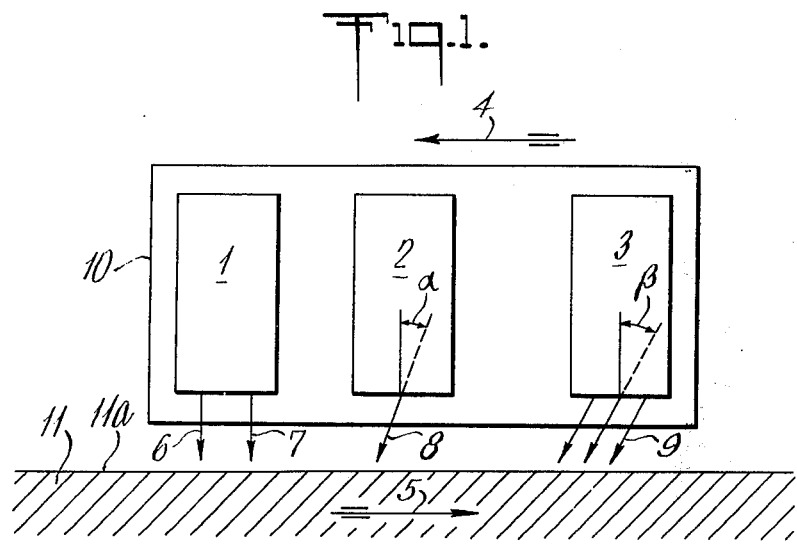
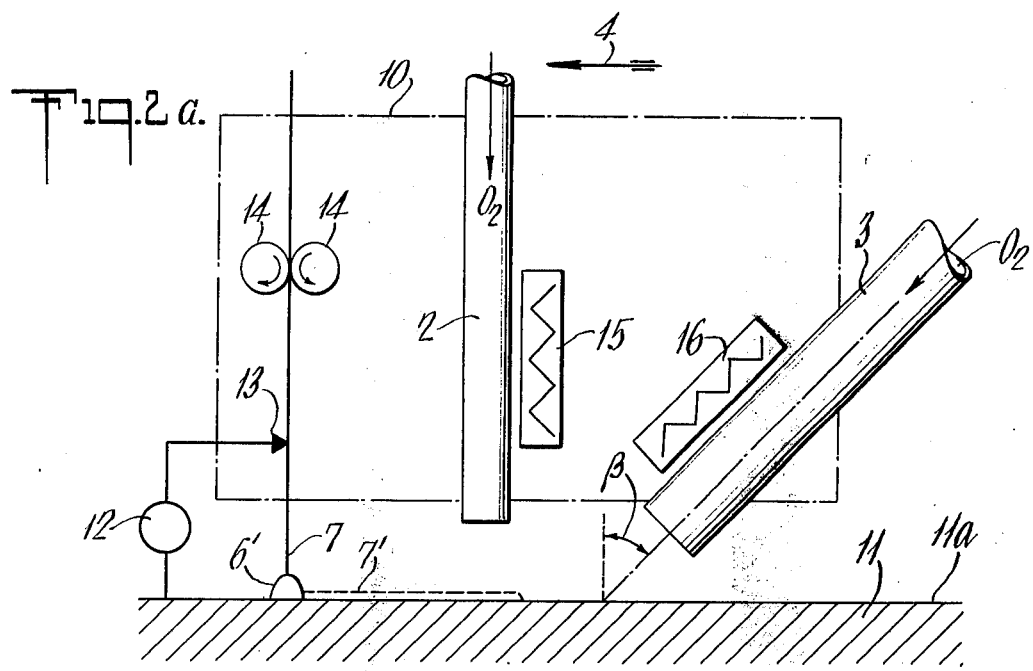
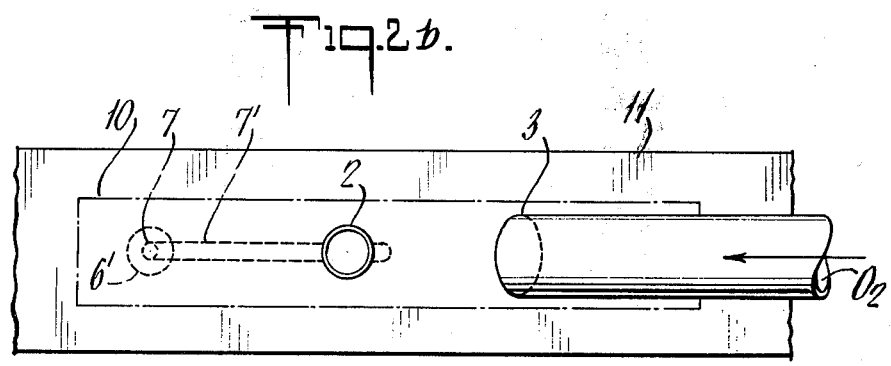

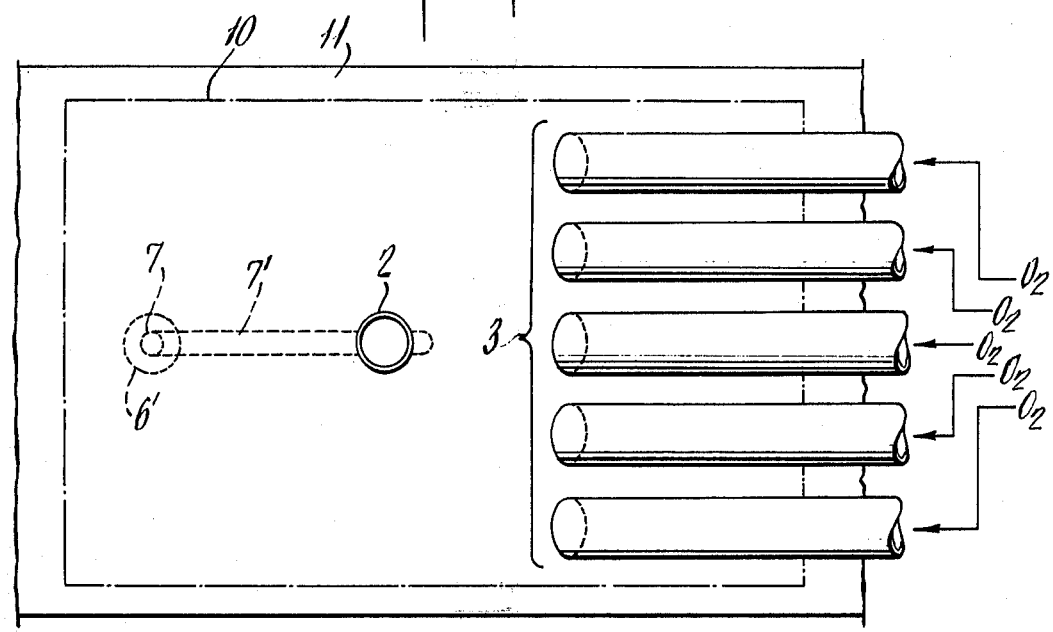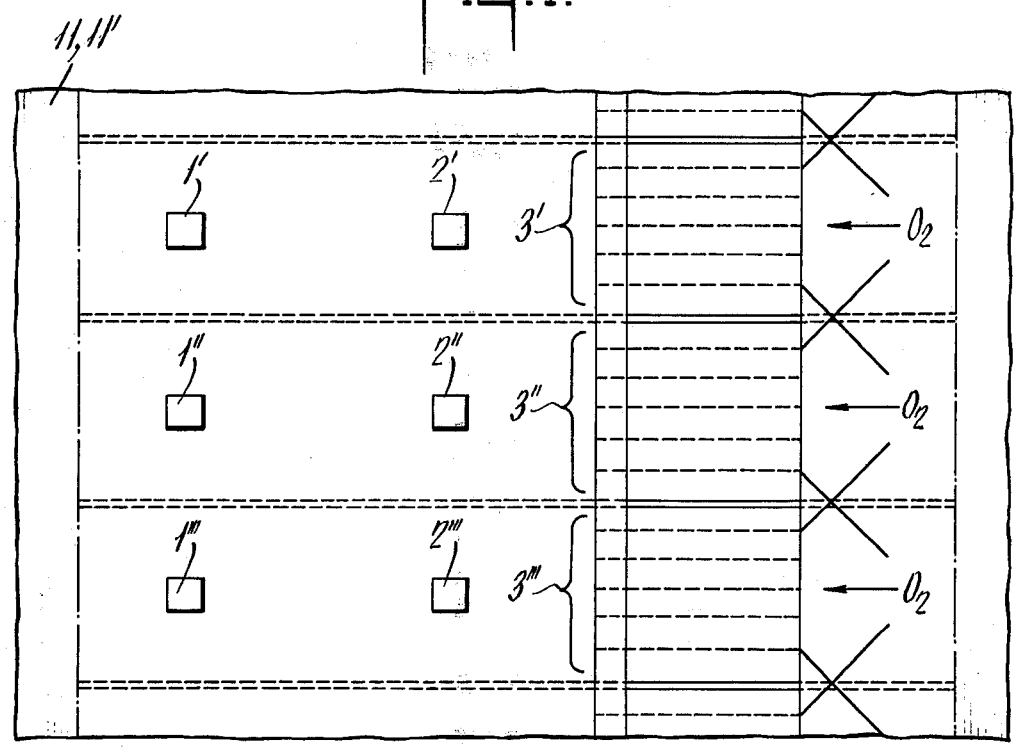

METHOD AND APPARATUS FOR THERMOCHEMICAL GAS SCARFING

BACKGROUND OF THE INVENTION

In production of sheet, strips and other steel products it is necessary to remove surface defects like cracks, flakes and scabs, before the slabs or billets are rolled out. The surface defects are removed by thermochemical scarfing, in which strong heat and oxygen are acting in the surface of the slab or billet. In thermochemical scarfing the scarfed surface is melted down and a certain part of the molten iron is oxidized, a considerable amount of heat being developed simultaneously.

In practice either so called surface scarfing or spot scarfing is applied. In surface scarfing the entire surface of the slab or billet is scarfed to a certain depth, determined by quality claims, or to the penetration of the deepest defect occurring. This method is obviously uneconomic as, in some cases, it is necessary to remove up to 2 to 4% of the total weight of the slab or billet. For that reason, especially in cold scarfing, so called spot scarfing is often used. Scarf scarfing implies local removal of surface defects. The most common method is selective manual scarfing, but lately efforts have also been made to design machines for selective spot scarfing. The great problem as to selective spot scarfing is the ignition of the exothermic reaction which makes thermochemical scarfing possible.

A scarfing process with sufficiently rapid ignition is a necessary condition to realize a fast working selective spot scarfer, as flying start must be used.

The best known ignition method is to feed an iron wire or iron powder into the flame during the ignition period. Generally fuel gas flames (e.g., acetylene with oxygen) are used which are directed towards the point of the work-piece where the scarfing is to start. The iron wire or iron powder is melted and oxidized in the hot fuel gas flame and the stream of scarfing oxygen. The hot slag and the heat from the combustion of the iron wire or iron powder together with the heat from the fuel gas flame hit the work-piece and ignite the scarfing process. The use of iron wire or iron powder shortens the ignition time considerably. In spite of that the ignition takes at best from 2 to 4 seconds. Even if the work-piece is moving at relatively low velocity, e.g., 5 cm/s, its movement during the ignition period will still be unacceptably long. Consequently, either the work-piece must be stopped or the torch move together with the work-piece during the ignition. If the work-piece must be stopped, there will, of course, be no flying start, and if the torch must move together with the work-piece, such a design will be complicated and less reliable. The use of iron or iron powder as filler material for ignition which is needed in relatively large quantities, sometimes causes a larger cost for the consumed filler material than the cost of the iron saved by the selective spot scarfing.

It has been suggested that the ignition of the spot scarfing process could be shortened further by means of a method using an electric arc for the ignition process. The arc is burning between a non-consumable pilot electrode and the region of the work-piece where the scarfing is to start. Immediately after a molten pool has appeared in the desired region of the work-piece, a stream of scarfing oxygen together with an oxyacetylene flame from a conventional scarfing torch is directed toward the molten pool, and the electric pilot electrode is rapidly withdrawn from the operating region. It is said that the ignition time with this method can be shortened further, 10 to 20 times, compared with a conventional ignition without pilot electrode or iron wire. This ignition takes 5–10 seconds. Thus it would be possible to bring down the ignition period to some tenths of a second. A serious disadvantage with this method is that the pilot electrode which strikes in an active medium is exposed to considerable wear and spatter of slag from the molten pool.

Another method has been proposed to initiate the combustion process in spot scarfing with flying start, namely to use a consumable electrode of iron or of other metal. An electric arc between the electrode tip and the billet causes a part of the wire to be consumed and together with the molten metal in the surface of the billet forms the starting point of the thermochemical combustion process in the surface of the billet during the scarfing process. The initiation of the chemical combustion as well as the scarfing is carried out with a torch, comprising oxygen nozzles and gas flames in a conventional manner. However, it seems to be necessary in this case that the electric arc for a certain time be burning in the direction of one and the same point in the surface of the billet to make ignition possible. To attain a flying start it is necessary that the electrode holder, by means of a mechanical arrangement, make such a movement in relation to the torch head, passing over the billet, that said holder in relation to the surface of the billet is at rest while the arc is burning. The implementation of such a mechanical arrangement is extremely difficult.

In all the methods, mentioned above and used hitherto, the combustion of iron in the scarfing process is not an entirely self-supporting reaction, as to the need for heat. Heat must be supplied which, as mentioned above, is usually done with one or more fuel gas flames, fed for instance with acetylene and oxygen, which are directed toward the operating region. Although this is the most common scarfing method in practice, it still has disadvantages.

The disadvantages are inherent both in principle and design. The scarfing device is also used to start the chemical combustion. As it is designed for maximum scarfing rate, it cannot fulfill the requirements of a device for starting the chemical combustion process in an optimal way. Gases from the fuel gas flames mix with the scarfing oxygen and rarefy it which has the effect that the start of the chemical combustion is made still more difficult and that the scarfing rate is limited. The streams of oxygen and hot fuel gases even influence each other so that starting pits, ridges and burrs are easily formed in the scarfed surface and the process is hard to control. The poor controllability of the process results in the problem that, while scarfing is in progress, the scarfing depth can be changed only by regulation of the scarfing speed. In ramp construction of spot scarfers with several independently working torches, there might be — among other things — difficulties in keeping the low heat flames burning in the torches and they might not work for a moment.

Another disadvantage with fuel gas flames for maintenance of the combustion process is the risk of explosion and backfire in the torches.

SUMMARY OF THE INVENTION

All the above-mentioned disadvantages concerning ignition and scarfing do not exist in the method and the apparatus according to the present invention. The invention consists of a new method of ignition and scarfing and a device for the accomplishment of the method.

The ignition, according to this invention, is in comparison with other previously known methods the most rapid one and makes possible a flying start without starting pits. The method is thereby especially applicable to automatic spot scarfing. The scarfing process, according to the present invention, also makes possible a higher scarfing speed as well as control of the scarfing depth at constant travel speed without forming ridges. The scarfing method, according to this invention, is cheaper in operation than other known methods.

The method is principally characterized by the fact that the ignition and the scarfing processes comprise three in time and space separated phases, in which the first phase includes preheating and possibly also melting of the material in a spot or a zone at the beginning of the surface defect in the workpiece, possibly in combination with the deposition of a certain quantity of filler material; in which the second phase comprises a chemical combustion of the melted material in the spot or zone and an extension of the burning area over a certain part of the workpiece, and in which the third phase comprises the very scarfing of the material, i.e., the removal process.

DETAILED DESCRIPTION OF THE DRAWINGS

The invention is illustrated more closely in connection with the attached drawings, where FIG. 1 shows the method and FIGS. 2, 3 and 4 show examples of the application of the invention.

FIG. 1 shows, according to the invention, the division in time and space of the scarfing process into three different functions and main parts, namely
  a. preheating and/or melting
  b. starting of the chemical combustion process
  c. the very scarfing process.

FIGS. 2a and 2b show an example of apparatus for carrying out the method, according to the present invention.

FIG. 3 shows examples of division of the scarfing device into submodules.

FIG. 4 shows examples of combination of module-devices to groups of two or more torch units.

The three separated functions and main parts of the process and device are illustrated in FIG. 1, where 1 is preheating and deposition; where 2 is the oxygen igniter and where 3 is the oxygen scarfing device. All these three parts are preferably mechanically firmly connected with each other but separated at certain fixed distances and form together a torch unit, 10. In FIG. 1 the surface of the slab or billet unit 11 to be machined is designated as 11a. During the ignition and scarfing process the torch unit is moving continuously in relation to the surface of the slab or billet at a certain speed in direction 4 (to the left in the figure). Alternatively, the slab or billet might move in direction 5 (to the right in the figure) in relation to the torch unit.

The preheating and deposition device generally referred to is the penetration device comprising the first or both of the following functions:
a. A heat source 6 provides for heating of the spot or zone in the surface of the slab or billet, where the thermochemical combustion process is to start, and provides for heating and/or deposition or melting of combustible filler material 7 in the form of e.g. wire, strip or powder, if such is being used.
b. A device provides for the feeding of filler material 7 up to the spot in the surface of the slab or billet where it, together with material in the surface of the slab or billet, is heated and possibly is melted.

The preheating and deposition device or penetration device 1 can for instance be designed according to one of the following alternatives.
  a. One or more fuel gas flames, preferably fed with acetylene and oxygen, heat the spot or the zone in the surface of the slab or billet, where the combustion is to start, to a temperature sufficient for the start of a thermochemical combustion at the moment when pure oxygen from the oxygen igniter is streaming in the direction of the spot or zone.
  b. One or more fuel gas flames, according to alternative (a) are used, in combination with a feeding device for filler material in wire or strip form whereby a certain quantity of the wire or strip in melted condition is conveyed to the spot or zone in the surface of the slab or billet where the chemical combustion is to start.
  c. One or more fuel gas flames and filler material, according to alternative (b) are used, but where the supplied material, instead of wire or strip, consists of powder.
  d. A device is used with one or more electric arcs between non-consumable electrodes and the spot or zone in the surface of the slab or billet which is to be heated to the ignition temperature.
  e. An arc device, according to alternative (d) is used but with further one or more feeding devices for filler material in the form of wire, strip or powder which is melted by the arc and conveyed to the surface of the slab or billet.
  f. A device, according to FIG. 2 is used with one or more electric arcs 6' between consumable wire formed electrodes 7 of iron or other metal and the spot or the zone 7' in the surface of the billet where a thermochemical combustion is to start whereby a certain quantity of the electrode material is deposited and conveyed to the spot or zone in the surface of the billet at the same time as this is heated and possibly partly melted by the arc heat. Hereby, a power source 12, according to FIG. 2, a current conducting contact 13 and a device 14 for feeding of the electrode material are used.
  g. A device, according to alternative (f) is used, but with the consumable electrode as a strip. By means of a strip electrode it is possible to produce a wide zone in the surface of the slab or billet prepared for ignition of the combustion. The width of the zone can be predetermined by choice of the width of the strip.
  h. One or more plasma torches are used, which, by a non-transferred arc or an arc transferred to the surface of the slab or billet, heat the spot or zone in the surface, where the combustion is to start, to ignition temperature.
  i. One or more plasma torches are used, according to alternative (h), but with a feed device for filler material in the form of a wire or strip, which is fed into the arc plasma or the molten pool and where it is melted down and fed to the spot or zone in the surface of the slab or billet. The filler wire can be fed into the arc plasma at an angle to the axis symmetri of the plasma torch below its outlet nozzle or it can be fed through the plasma torch more or less axially and out through its outlet nozzle. The device can be designed in such way that the filler wire also becomes current conducting according to previously known manners.

j. One or more plasma torches are used, according to alternative (h) but with a feeding device for filler material in the form of powder which is fed into the arc plasma, heated and conveyed to the spot or zone in the surface of the slab or billet.

The oxygen igniters 2, 2', 2'' and 2''' in FIGS. 1, 2a, 2b, 3 and 4 serve to start the thermochemical combustion process in the spot or zone in the surface of the slab or billet, heated by the preheating device, and to extend this combustion over a larger area and preferably in directions perpendicular to the direction of motion of the torch or billet.

The oxygen igniter designed with one or more ducts with specially formed nozzles out of which pure oxygen is streaming towards the surface of the billet. The pressure and design of the nozzles are made in such a way that the stream of oxygen, flowing towards the surface has a certain size, speed and sectional geometry, preferably circular or oval, and forms a certain angle $\alpha$ to the normal axis or the surface. This angle is preferably in between 0° and 45°.

The oxygen scarfer 3, 3', 3'' and 3''' in FIGS. 1, 2a, 2b, 3 and 4 provide for the removal of material in the scarfing process. Each oxygen scarfer consists of one or more ducts with attached outlet nozzles out of which pure oxygen 9 with the size and speed of the gas flow adapted to the desired scarfing speed is flowing towards the region in the surface of the billet to be scarfed. The velocity of the oxygen flow streaming out from the nozzles has a direction which forms an angle $\beta$ with the normal axis of the surface of the billet, preferably between 0° and 60°.

The scarfer can be designed with an outlet nozzle giving an oxygen flow, principally circular, oval, bevelled, rectangular or with other cross section with a small ratio between the highest and smallest extension, preferably less than 2 and with the direction of flux at an angle with the normal axis of the surface of the billet, preferably between 0° and 60° By choice of the geometry of the outlet nozzle, gas flow and travel speed, different width and depth of the scarfed groove can be obtained. A scarfer designed in this way is used primarily when a single torch unit is in action, when only one groove is to be scarfed at a time and when a groove profile with the largest depth in the middle is desired.

The scarfing device can also be designed with an outlet nozzle which provides an oxygen flow with a cross section, the extension of which in transverse direction of the scarfing groove is large in relation to its extension in longitudinal direction. The direction of the oxygen flow at the nozzle outlet is then to form an angle $\beta$ with the normal, preferably between 30° and 60°. A scarfing device, according to this design, is used preferably when a groove profile with a principally plane base is desirable, when two or more torch units are to work side by side and when two or more grooves side by side are to be scarfed simultaneously.

According to FIG. 3, the nozzle of the scarfing device can then also be divided into submodules with or without separate control of the gas flows. In FIG. 3, 3 symbolizes such a module, divided into submodules. With separately controlled gas flows it is possible to choose the width of the scarfed groove. A torch unit comprising a preheating device, an oxygen igniter and an oxygen scarfing device, where the scarfing device comprises, e.g., 10 submodules, each with an extension in the transverse direction of the groove of, e.g., 2 centimeters and with individually controlled oxygen flows, can scarf grooves with a width to be chosen between, e.g., 6, 10, 14 and 18 centimeters.

Such division into submodules of the scarfing device also makes it possible to connect two or more torch units side by side, according to FIG. 4 and make them work individually or two or more simultaneously.

In FIG. 4 the preheating devices are marked 1', 1'', and 1''', the oxygen igniters are marked 2', 2'' and 2''' and the scarfing devices are marked 3', 3'' and 3'''. In order that every individually working torch unit may provide a groove width, corresponding to the whole geometrical width of one module, an overlapping system is used in such way that, in the border region between one active and one passive torch module, oxygen is also fed to that submodule of the passive module which is closest to the active module. By choice of the geometry of the nozzles, gas flow and travel speed, scarfing to different depths can be done.

It is to be noted that, according to the invention, in the oxygen ignition process as well as in the scarfing process only pure oxygen is made to flow towards the surface to be scarfed without addition of gases from a fuel gas flame. This condition in combination with the system for preheating and premelting, oxygen ignition and the design of the oxygen flow from the scarfer make the scarfing process, according to the invention, totally self-supporting, as to the need for heat.

The scarfing device and possibly even the oxygen igniter might be equipped with a device for preheating of the oxygen in order to increase the scarfing speed. Such preheating can be accomplished by making the gas before the outlet of the nozzle or nozzles pass heat exchangers, 15 and 16 in FIG. 2a which, e.g., can comprise electrically resistively heated bodies in the form of spirals or tubes. Preheating can also be accomplished, if the oxygen is allowed to stream through the ducts, the walls of which are heated differently, e.g., by fuel gas flames. To increase the concentration of oxygen in the scarfing surface the oxygen can, alternatively, be fed in cooled or fluid condition from the scarfing device and possibly also from the oxygen igniter, in which case the nozzles must be designed with regard to this.

The starting procedure of the scarfing process is accomplished as follows. The torch unit is moved at a certain speed over the surface of the billet in its longitudinal direction 4 in FIG. 1 and FIG. 2a. When the preheating/melting device of the torch unit is above the spot in the surface of the billet where the scarfing is to start, the heat source, which can comprise gas flames or electric arc 6' is ignited, and possible filler material, e.g., iron wire 7 is fed by means of a wire feeder 14. The electric arc 6' is supplied via a contact device 13 from a power source 12. A spot of zone 7' with heated and possibly melted material is formed in the surface. When the oxygen igniter 2 passes this spot or zone, its oxygen flow is switched on, whereby the thermochemical combustion process starts in the preheated spot or zone. It spreads outwards in all directions and the burning area is extended rapidly even to the sides. When the scarfing device 3 passes the area, ignited over a large width, its oxygen flow is switched on, whereby the real scarfing of the material starts immediately over a large width. The preheating device can operate during the entire scarfing process but can preferably be switched off, when the oxygen igniter is switched on or immediately before or after that. The oxygen igniter can be operating with full gas flow during the entire scarfing moment but can preferably also be switched off or be switched over to reduced gas flow, when the scarfing device is switched on or immediately before or after that. Herefrom it is evident that the method and apparatus to ignite and sustain the thermochemical scarfing process contain three in time and space separated functions and arrangements.

Other forms of the invention not described here are possible, e.g., 1. a change of the angle $\beta$ for control of the groove geometry,
2. a combination of separate oxygen igniter, according to the invention, with conventional scarfer device with fuel gas flames,
3. the use of filler of iron powder or other consumable material in the oxygen igniter and/or scarfing device to facilitate scarfing in alloy steel or other metals.

We claim as our invention:

1. A method for initiating and supporting a thermochemical process of scarfing the surface of a workpiece in order to remove surface defects comprising the steps of continuously relatively moving a workpiece having surface defects through a preheating station, a combustion station, and a scarfing station, preheating at said preheating station a zone of said workpiece to form a molten area of molten material at said zone, simultaneously combusting at said combusting station a zone of said workpiece which has previously been preheated at said preheating station to combust said molten material and extend said molten area over a predetermined area of said workpiece, simultaneously scarfing at said scarfing station a zone of said workpiece which has previously been preheated at said preheating station and chemically combusted at said combusting station, and continuing said steps until a desired degree of scarfing is completed.

2. The method for initiating and supporting a thermochemical process of scarfing the surface of a work piece in order to remove surface defects of claim 1 wherein said step of preheating includes the step of depositing a predetermined quantity of filler material.

3. The method for initiating and supporting a thermochemical process of scarfing the surface of a work piece in order to remove surface defects of claim 1 wherein said step of chemically combusting includes the step of feeding pure oxygen to the surface of the work piece.

4. The method for initiating and supporting a thermochemical process of scarfing the surface of a work piece in order to remove surface defects of claim 3 wherein said scarfing step also includes the feeding of pure oxygen without the addition of other gasses to the surface of the work piece.

5. The method for initiating and supporting a thermochemical process of scarfing the surface of a work piece in order to remove surface defects of claim 1 wherein said step of preheating is accomplished by means of providing heat from a plasma torch.

6. A device for initiating and supporting a thermochemical process of scarfing the surface of a work piece in order to remove surface defects comprising means for continuously relatively moving a work piece having surface defects through a preheating station, a combustion station, and a scarfing station, means for preheating at said preheating station a zone of said work piece to form a molten area of molten material at said zone, means for simultaneously combusting at said combusting station a zone of said work piece which has been previously preheated at said preheating station to combust said molten material and extend said molten area over a predetermined area of said work piece, and means for simultaneously scarfing at said scarfing station a zone of said work piece which has been previously preheated at said preheating station and chemically combusted at said combusting station.

7. The device for initiating and supporting a thermochemical process of scarfing the surface of a work piece in order to remove surface defects of claim 6 wherein said means for combusting comprises oxygen ignition means and said means for scarfing comprises oxygen scarfing means.

8. The device for initiating and supporting a thermochemical process of scarfing the surface of a work piece in order to remove surface defects of claim 7 wherein said oxygen ignition means comprises an oxygen ignition nozzle placed at an angle to the normal axis of the surface of a work piece.

9. The device for initiating and supporting a thermochemical process of scarfing the surface of a work piece in order to remove surface defects of claim 8 wherein said angle of the oxygen ignition nozzle is between 0° and 45° to the normal axis of the surface of the work piece.

10. The device for initiating and supporting a thermochemical process of scarfing the surface of a work piece in order to remove surface defects of claim 7 wherein said oxygen scarfing means comprises at least one oxygen scarfing nozzle, said nozzle being positioned at an angle to the normal axis of the surface of the work piece.

11. The device for initiating and supporting a thermochemical process of scarfing the surface of a work piece in order to remove surface defects of claim 10 wherein said oxygen scarfing nozzle is positioned at an angle between 0° and 60° to the normal axis of the surface of the work piece.

12. The device for initiating and supporting a thermochemical process of scarfing the surface of a work piece in order to remove surface defects of claim 11 wherein said angle of said oxygen scarfing nozzle is between 30° and 60° to the normal axis of the surface of the work piece.

13. The device for initiating and supporting a thermo-chemical process of scarfing the surface of a work piece in order to remove surface defects of claim 10 wherein said oxygen scarfing nozzle has a cross section where the ratio between the largest and smallest dimension is less than 2.

14. The device for initiating and supporting a thermochemical process of scarfing the surface of a work piece in order to remove surface defects of claim 7 wherein said oxygen ignition means and said oxygen scarfing means comprise at least two torch unit modules placed together side by side.

15. The device for initiating and supporting a thermochemical process of scarfing the surface of a work piece in order to remove surface defects of claim 7 further comprising means for heating oxygen to be supplied by said oxygen ignition means and said oxygen scarfing means before said oxygen leaves the respective nozzles.

* * * * *